United States Patent [19]

Wu et al.

[11] 3,723,553

[45] Mar. 27, 1973

[54] CYCLOTRIMERIZATION OF BUTADIENE, USING NICKEL CATALYST

[75] Inventors: Ching Yong Wu, Pittsburgh; Harold E. Swift, Gibsonia, both of Pa.

[73] Assignee: The B. F. Goodrich Company, New York, N.Y.

[22] Filed: Dec. 27, 1971

[21] Appl. No.: 212,726

[52] U.S. Cl. ..........................260/666 B, 252/431 N
[51] Int. Cl. ................................................C07c 3/10
[58] Field of Search ................260/666 B; 252/431 N

[56] References Cited

UNITED STATES PATENTS 3,565,875   2/1971   Bozik et al........................252/431 N
3,651,065   3/1972   Yagi et al..........................260/666 B
3,678,022   7/1972   Bozik et al........................252/431 N

*Primary Examiner*—Delbert E. Gantz
*Assistant Examiner*—Veronica O'Keefe
*Attorney*—Robert W. Wilson et al.

[57] ABSTRACT

Butadiene is cyclotrimerized to 1,5,9-cyclododecatriene in the presence of a catalyst consisting of a trialkyl aluminum, nickel (II) acetylacetonate, and a Schiff base prepared by the condensation of the aldehyde or ketone of a heterocyclic compound with an aniline or toluidine compound.

6 Claims, No Drawings

CYCLOTRIMERIZATION OF BUTADIENE, USING NICKEL CATALYST

CROSS-REFERENCES TO RELATED APPLICATIONS

This invention is highly specific in the use of nickel (II) acetylacetonate in a three-component catalyst system for the cyclotrimerization of butadiene-1,3 (hereinafter butadiene). Other catalyst systems using Fe(III) acetylacetonate in the cyclodimerization of conjugated dienes, Cr(III) acetylacetonate in the preparation of low-molecular-weight polymers, and Co(III) acetylacetonate in the preparation of linear and cyclic oligomers in related inventions are described in copending applications Ser. No. 212,623 filed Dec. 27, 1971; Ser. No. 212,733 filed Dec. 27, 1971, and Ser. No. 220,432 filed Jan. 24, 1972.

BACKGROUND OF THE INVENTION

1. Field of the Invention

This invention relates to the preparation of 1,5,9-cyclododecatriene by the cyclotrimerization of butadiene-1,3 (hereinafter "butadiene") under the influence of a highly specific three-component catalyst system.

2. Description of the Prior Art

Catalyst systems heretofore employed in the cyclotrimerization of butadiene have been generally two-component systems. While useful, these systems have produced undesirable by-products in some cases, and in others have required dilution of the reaction medium in order to suppress the side reactions leading to these by-products.

In many circumstances, the presence of varying amounts of by-product olefins would not affect the uses of the main product. However, in ring-opening polymerization reactions, such by-products as vinyl-cyclohexene (VCH) are undesirable, and in some cases, may poison the catalyst.

In U.S. Pat. No. 3,565,875, Bozik et al. describe a three-component catalyst system for the polymerization of olefins, diolefins, and alkylene oxides. The Bozik patent, however, employs an iron salt as one component, while the present invention is specific in the use of nickel (II) acetylacetonate as part of a catalyst system in the reaction of butadiene only.

SUMMARY OF THE INVENTION

The present invention is the method for preparing 1,5,9-cyclododecatriene which consists of contacting butadiene with a catalyst consisting of
1. nickel (II) acetylacetonate,
2. a trialkyl aluminum in which each alkyl group contains from 1 to 8 carbons, and
3. a Schiff base characterized by the structural formula

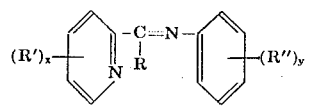

wherein R is hydrogen, an alkyl radical of from 1 to 6 carbons, or an aryl radical of from 6 to 10 carbons, R' and R'', which can be the same or different, and are alkyl radicals of from 1 to 6 carbons, and x and y are 0 or 1, at a temperature between 100° and 175°C, and recovering said 1,5,9-cyclododecatriene.

It has been discovered that the addition of specific bidentate ligands to existing catalyst systems markedly improves conversion of butadiene and selectivity of the reaction to produce the desired 1,5,9-cyclododecatriene.

The utility of the instant invention as, e.g., a monomer in ring-opening polymerizations is enhanced by the relatively low level of by-product formation. The production of 1,5,9-cyclododecatriene with only minor amounts of such materials as VCH is commercially advantageous, since little or no treatment is then necessary to prepare the monomer for the polymerization process.

DESCRIPTION OF THE INVENTION

The present invention uses a highly specific three-component catalyst system for the cyclotrimerization of butadiene. These components are: a Schiff base, a trialkyl aluminum, and nickel (II) acetylacetonate The Schiff bases employed in the method of the present invention are bidentate ligands derived from aniline or toluidine by condensation with carbonyl-substituted pyridine-family compounds. Of these, the Schiff bases without alkyl substitution in the pyridine ring are preferred, with the most preferred being α-(2-pyridyl)benzylidene-p-toluidine (PBT),

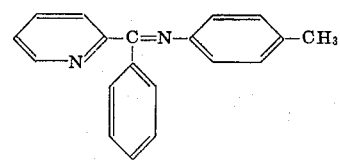

α-(2-pyridyl)benzylidene aniline (PBA),

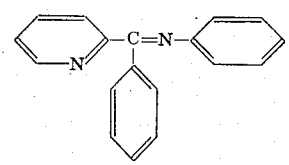

and 2-picolylidene aniline (2PA),

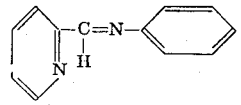

The trialkyl aluminum of the present invention contains alkyl groups of from 2 to about 8 carbon atoms. Preferred are trialkyl aluminums where each alkyl group contains from 2 to 4 carbon atoms, while triethyl aluminum and triisobutyl aluminum are most preferred.

Cyclotrimerization of butadiene by the method of the present invention is effected by contacting the catalyst components with butadiene in the absence of oxygen and moisture, and maintaining a reaction temperature between about 0° and 175°C, and preferably between about 25° and 125°C until a commercially desirable conversion level is reached.

While the cyclotrimerization method of the present invention can be carried out in the absence of solvent, it is generally easier to handle the materials employed in an inert hydrocarbon solution, such as benzene, toluene, or the like. Solvents with functional or catalyst-reactive groups, e.g., chlorobenzene, alcohol groups, etc., are undesirable, and can result in complete inhibition of the reaction.

It has further been discovered that the specificity of the catalyst system extends to the trialkyl aluminum; an attempt to substitute diethyl aluminum chloride for the trialkyl aluminum results in an inactive catalyst system.

The molar ratios of the catalyst components must be maintained within certain limits, as shown by the examples hereinbelow. The aluminum/nickel ratio should be between 1/1 and 4/1, preferably between 1.5/1 and 2.5/1. The ratio of Schiff base to nickel should be between about 0.25/1 and 3/1, preferably between about 0.5/1 and 3/1.

The 1,5,9-cyclododecatriene produced by the method of the present invention is readily separated from small amounts of by-product by suitable distillation methods, or other separation techniques well known to those skilled in the art.

The following examples show the operation of the method of the present invention.

EXAMPLE I

A 250-milliliter (ml) pressure bottle is cleaned, dried, and purged of oxygen with dry nitrogen. 1.5 millimoles (mmol) nickel acetylacetonate, 1.5 mmol α-(2-pyridyl)-benzylidene aniline, 100 ml toluene, 1.5 mmol triethyl aluminum, and 500 mmol butadiene are added in the order named, and kept under dry nitrogen. The pressure bottle is heated to 110°C and stirred at that temperature for 4 hours. Two ml of methanol are added to destroy the catalyst, and 1,5,9-cyclododecatriene is obtained by distillation from the mixture in 75 percent yield.

Other examples of the operation of the instant invention are shown in the following table. The conditions of Example I are modified as shown.

| Ex. No. | AlR$_3$ | Schiff base [1] | Al/Ni ratio | Schiff/Ni ratio | Solvent | Temp., °C. | Yield, percent |
|---|---|---|---|---|---|---|---|
| 2 | C$_2$ | PBT | 2/1 | 0.25/1 | Toluene | 120 | 32 |
| 3 | C$_2$ | PBT | 2/1 | 0.5/1 | do | 120 | 85 |
| 4 | C$_2$ | PBT | 2/1 | 1.0/1 | do | 120 | 81 |
| 5 | C$_2$ | 2PA | 1/1 | 0.5/1 | do | 120 | 62 |
| 6 | C$_2$ | PBA | 2/1 | 0.5/1 | do | 120 | 85 |
| 7 | iso-C$_4$ | PBT | 2/1 | 0.5/1 | do | 120 | 47 |
| 8 | C$_2$ | PBT | 2/1 | 0.5/1 | None | 110 | 62 |
| 9 | C$_3$ | PBT | 4/1 | 3/1 | Toluene | 120 | 65 |

[1] PBT: α-(2-pyridyl)-benzylidene-p-toluidine.
2PA: 2-picolylidene aniline.
PBA: α-(2-pyridyl)-benzylidene aniline.

Example 10

The conditions of Example 3 are repeated, substituting diethylaluminum chloride for the triethyl aluminum. No reaction occurs; this example illustrates the specificity of the trialkyl aluminum moiety of the catalyst.

Example 11

The conditions of Example 3 are repeated, using chlorobenzene as the solvent, and running the reaction at the boiling point of chlorobenzene, 132°C. No reaction occurs; this example illustrates the necessity that the solvent, when used, be inert.

We claim:
1. The method for preparing 1,5,9-cyclododecatriene which comprises contacting butadiene-1,3 with a catalyst consisting of
    1. nickel (II) acetylacetonate,
    2. a trialkyl aluminum in which each alkyl group contains from 1 to 8 carbons, and
    3. a Schiff base characterized by the structural formula

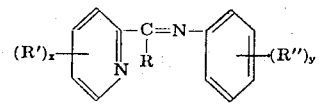

where R is hydrogen, an alkyl radical of from 1 to 6 carbons, or an aryl radical of from 6 to 10 carbons, R' and R'', which can be the same or different, are alkyl radicals of from 1 to 6 carbons, and $x$ and $y$ are 0 or 1, at a temperature between 0° and 175°C, and recovering said 1,5,9-cyclododecatriene.

2. The method of claim 1 wherein the molar ratio of aluminum to nickel is between 1/1 and 4/1, and the molar ratio of said Schiff base to nickel is between 0.25/1 and 3/1.

3. The method of claim 1 wherein R is hydrogen or phenyl, and $x$ is zero.

4. The method of claim 1 wherein the reaction is conducted in an inert hydrocarbon medium.

5. The method of claim 1 wherein each alkyl group of said trialkyl aluminum contains from 2 to 4 carbons.

6. The method of claim 1 wherein said Schiff base is selected from the group consisting of α-(2-pyridyl) benzylidine aniline, α-(2-pyridyl) benzylidine p-toluidine, and 2-picolylidene aniline.

* * * * *